(12) United States Patent
Wieland et al.

(10) Patent No.: US 8,575,482 B2
(45) Date of Patent: Nov. 5, 2013

(54) INTERFACE FOR AN ENCLOSURE FOR HOUSING AN ELECTRICAL OR ELECTRONIC DEVICE

(75) Inventors: Andrew D. Wieland, Fargo, ND (US); Joe S. Sauvageau, Oxbow, ND (US)

(73) Assignee: Deere & Company, Moline, IL (US)

( * ) Notice: Subject to any disclaimer, the term of this patent is extended or adjusted under 35 U.S.C. 154(b) by 178 days.

(21) Appl. No.: 13/170,218

(22) Filed: Jun. 28, 2011

(65) Prior Publication Data
US 2012/0217055 A1 Aug. 30, 2012

Related U.S. Application Data

(60) Provisional application No. 61/447,340, filed on Feb. 28, 2011.

(51) Int. Cl.
*H01J 5/00* (2006.01)
*H01J 15/00* (2006.01)
*H01J 5/06* (2006.01)

(52) U.S. Cl.
USPC .................. 174/50.52; 174/50.5; 174/50.59; 174/50.53; 174/50.57

(58) Field of Classification Search
USPC ............ 174/50.5, 50.52, 50.53, 50.54, 50.55, 174/50.56, 50.57, 50.59, 50.62, 50.63, 564, 174/129 B, 133 B; 361/657, 675, 775; 439/89, 278, 279
See application file for complete search history.

(56) References Cited

U.S. PATENT DOCUMENTS

| 4,023,083 A | 5/1977 | Plunkett |
|---|---|---|
| 4,814,677 A | 3/1989 | Plunkett |
| 5,428,283 A | 6/1995 | Kalman et al. |
| 5,486,748 A | 1/1996 | Konrad et al. |
| 5,914,582 A | 6/1999 | Takamoto et al. |
| 6,275,000 B1 | 8/2001 | Nishimura |
| 7,045,988 B2 | 5/2006 | Ha et al. |
| 7,157,878 B2 | 1/2007 | Collier-Hallman |
| 7,733,044 B2 | 6/2010 | Nakamura et al. |
| 2006/0247829 A1 | 11/2006 | Sato |
| 2010/0188033 A1 | 7/2010 | Daboussi et al. |
| 2010/0265667 A1* | 10/2010 | Masucci et al. ............... 361/730 |
| 2011/0186350 A1* | 8/2011 | Guntermann et al. ........ 174/652 |

FOREIGN PATENT DOCUMENTS

DE 102010001381.1 * 1/2010

OTHER PUBLICATIONS

Elbuluk, Malik E. et al. Speed Sensorless Induction Motor Drives for Electrical Actuators: Schemes, Trends and Tradeoffs. NASA Technical Memorandum 107466. Retrieved from the Internet:<URL:http://www.esat.kuleuven.be/electa/publicatons/fulltexts/pub_479.pdf>.
US 7,595,604, 9/2009, Tomigashi (withdrawn).
Van Haute. S. et al. Design and Control of a Permanent Magnet Synchronous Motor Drive for a Hybrid Electric Vehcle. Retrieved from the Internet:<URL:http://www.esat.kuleuven.be/electa/publications/fulltexts/pub_444.pdf>.

* cited by examiner

*Primary Examiner* — Hoa C Nguyen
*Assistant Examiner* — Binh Tran

(57) ABSTRACT

An interface for an enclosure comprises at least one enclosure wall that separates an enclosure interior from an enclosure exterior, an opening in the enclosure wall, and a recess in the enclosure wall. The recess adjoins the opening. A dielectric connector is configured to securely fasten to the enclosure wall. The connector extends into the recess. A seal is situated in the recess between the enclosure wall and the connector. An inserted member is inserted through the opening and surrounded by the seal and the connector. Where the connector is securely fastened to the enclosure wall, the seal is compressed to form a moisture-resistant barrier between the enclosure interior and the enclosure exterior.

10 Claims, 1 Drawing Sheet

INTERFACE FOR AN ENCLOSURE FOR HOUSING AN ELECTRICAL OR ELECTRONIC DEVICE

This document claims priority based on U.S. provisional application Ser. No. 61/447,340, filed on 28 Feb. 2011 and entitled INTERFACE FOR AN ENCLOSURE FOR HOUSING AN ELECTRICAL OR ELECTRONIC DEVICE under 35 U.S.C. 119(e).

FIELD OF THE INVENTION

This invention relates to an interface for an enclosure for housing an electrical or electronic device.

BACKGROUND OF THE INVENTION

In certain prior art, an electronic device is housed in an enclosure and may control an electric motor on a vehicle. For example, the electronic device may comprise a motor controller or an inverter. The enclosure may prevent moisture and contaminants, such as dust, dirt, and salt, from entering the enclosure and damaging or interfering with electrical components or the electronic device inside the enclosure. However, a bus bar or other conductor that extends through the enclosure, or an elastomeric grommet therein, may provide an opportunity for moisture or other contaminants to enter or migrate into the enclosure. The bus bar or other conductor is essential to provide direct current power to the electronic device from a battery, a capacitor, or other electrical energy source. Thus, there is a need for an interface for an enclosure for housing an electrical or electronic device that seals the enclosure from moisture and contaminants, or that addresses other deficiencies in the prior art.

SUMMARY OF THE INVENTION

In accordance with one embodiment, an interface for an enclosure comprises at least one enclosure wall that separates an enclosure interior from an enclosure exterior, an opening in the enclosure wall, and a recess in the enclosure wall. The recess adjoins the opening. A dielectric connector is configured to securely fasten to the enclosure wall. The connector extends into the recess. A seal is situated in the recess between the enclosure wall and the connector. An inserted member is inserted through the opening and surrounded by the seal and the connector. Where the connector is securely fastened to the enclosure wall, the seal is compressed to form a moisture-resistant barrier between the enclosure interior and the enclosure exterior.

DESCRIPTION OF THE PREFERRED EMBODIMENT

Figure 1:
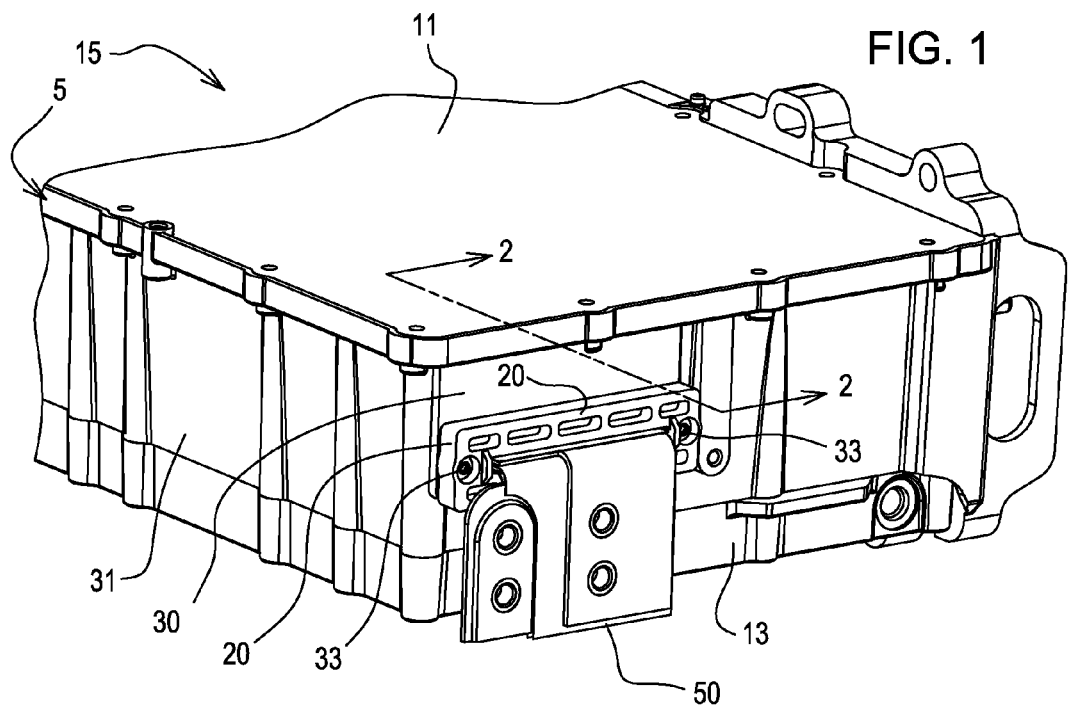
FIG. 1 is a perspective view of one illustrative embodiment of an interface for an enclosure for housing an electrical or electronic device.
Figure 2:
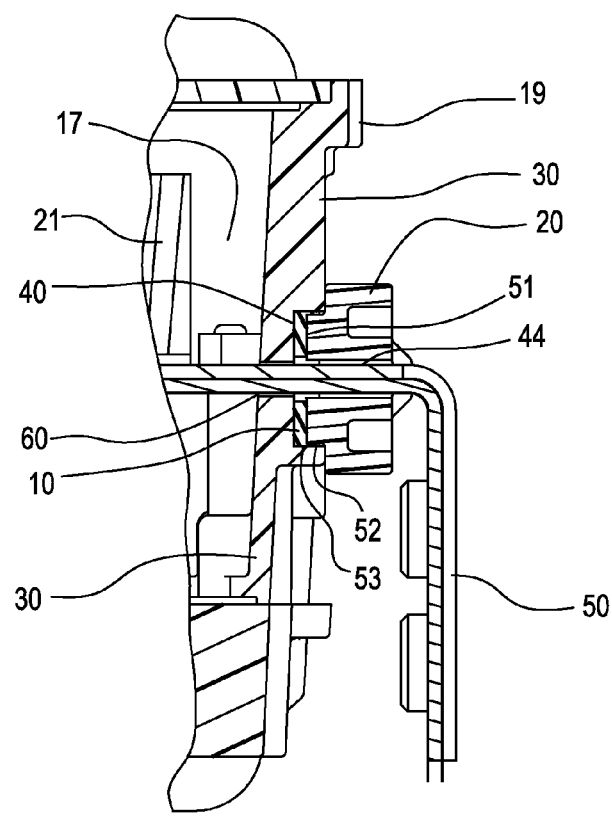
FIG. 2 is a cross-section view of the interface of FIG. 1 as viewed along reference line 2-2 of FIG. 1.

In accordance with one embodiment, FIG. 1 and FIG. 2 illustrate an interface 15 for an enclosure 5 for housing an electrical or electronic device. The interface 15 comprises an enclosure 5 for housing an electrical or electronic device. The enclosure 5 comprises at least one enclosure wall 30 that separates an enclosure interior 17 from an enclosure exterior 19, an opening 60 in the enclosure wall 30, and a recess 40 in the enclosure wall 30. Recess 40 adjoins opening 60. The interface 15 further comprises a dielectric connector 20 configured to securely fasten to the enclosure wall 30 (e.g., via one or more fasteners 33). The connector 20 extends into the recess 40. A seal 10 is situated in the recess 40 between the enclosure wall 30 and the connector 20. An inserted member 50 is inserted through the opening 60 and surrounded by the seal 10 and the connector 20. Securely fastening the connector 20 to the enclosure wall 30 via one or more fasteners 33, or via another mechanical fastening mechanism or adhesive, compresses the seal 10 to form a moisture-resistant and debris-resistant barrier between the enclosure interior 17 and the enclosure exterior 19. By providing such a moisture-resistant and debris-resistant barrier, the electrical or electronic device 21 housed inside the enclosure interior 17 are protected from harm caused by moisture or debris that otherwise could ingress or enter into the enclosure interior 17 from the enclosure exterior 19.

Enclosure

As shown in FIG. 1, enclosure 5 comprises at least one enclosure wall 30 that separates an enclosure interior from an enclosure exterior. In one embodiment, enclosure 5 comprises a generally polyhedral structure that is composed of one or more walls (30, 31) or sides, a top 11, and a bottom 13, or other sections. The enclosure, or its sections, are cast, molded, formed, or connected. For example, the walls may be generally polygonal, generally rectangular, or may have other geometric shapes. The enclosure 5 may contain an electrical or electronic device, for example, power electronics such as an inverter or motor controller of a control system for a mobile machine or vehicle.

The enclosure 5 is typically sealed to prevent moisture and debris that may be present in the environment surrounding the enclosure 5 from entering the enclosure interior. In one embodiment, joints of sections of the enclosure 5 are sealed (e.g., by gasket, seals or adhesives) to prevent moisture such as humidity, precipitation, or other liquids, and debris such as dust, dirt, salt, or other contaminants from entering the enclosure interior 17. For example, joints of the enclosure where the top 11 joints the walls (30, 31) may be sealed by gasket, seals or adhesives.

As shown in FIGS. 1 and 2, interface 15 further comprises an opening 60 in the enclosure wall 30. The presence of an opening 60 allows an inserted member 50 to be inserted into enclosure 5 and connect to components of the electrical or electronic device housed in the enclosure interior. The opening 60 may be generally cylindrical, generally rectangular, or may be any shape capable of accommodating inserted member 50.

In one embodiment, the interface 15 further comprises a recess 40 in the enclosure wall 30. Recess 40 adjoins opening 60. Seal 10 is situated in recess 40, and seal 10 surrounds inserted member 50. When dielectric connector 20, which extends into recess 40 and surrounds inserted member 50, is fastened to enclosure wall 30, seal 10 is compressed to fill the area defined by recess 40, connector 20, and inserted member 50. Thus, a moisture-resistant and debris-resistant barrier is formed at the entry point of inserted member 50 into enclosure 5.

In one configuration, the recess 40 may comprise an enclosure pocket that is generally cylindrical and wherein seal 10 is generally annular. Alternatively, recess 40 may comprise an enclosure pocket that is generally rectangular or polyhedral and wherein the seal 10 conforms in shape to a perimeter of the enclosure pocket. In another embodiment, recess 40 may comprise any shape capable of accommodating inserted member 50.

Seal

As shown in FIG. 1 and FIG. 2, interface 15 comprises a seal 10. Seal 10 is situated in recess 40 between enclosure wall 30 and dielectric connector 20. Seal 10 surrounds inserted member 50. In one embodiment, seal 10 may comprise a gasket.

The seal 10 deforms or is compressible to form a moisture-resistant and debris-resistant barrier in the area defined by recess 40, connector 20, and inserted member 50 when connector 20 is securely fastened to enclosure wall 30. When dielectric connector 20, which extends into recess 40 and surrounds inserted member 50, is fastened to enclosure wall 30, seal 10 is compressed to fill the area defined by recess 40, connector 20, and inserted member 50. Thus, a moisture-resistant and debris-resistant barrier is formed at the entry point of inserted member 50 into enclosure 5.

In one embodiment, the seal 10 is generally annular. In another embodiment, the seal 10 is generally rectangular or otherwise conforms in shape to a perimeter of the enclosure pocket.

In an alternate embodiment, the seal 10 may comprise any shape capable of surrounding inserted member 50 and deforming to form a moisture-resistant and debris-resistant seal in the area defined by recess 40, connector 20, and inserted member 50 when connector 20 is securely fastened to enclosure wall 30.

The seal 10 may be composed of an elastomer, a synthetic rubber, a silicone material, a latex rubber material, a vinyl material, or another pliable polymer or plastic material. In one embodiment, the seal may be composed of a gel-type material, such as GelTek, which is available from Dow Corning Corporation of Midland, Mich. Alternatively, the seal 10 may comprise any flexible, pliable, elastic or resilient dielectric material capable of deforming to form a moisture-resistant and debris-resistant barrier in the area defined by recess 40, connector 20, and inserted member 50 when connector 20 is securely fastened to enclosure wall 30.

Dielectric Connector

As shown in FIG. 1 and FIG. 2, the interface 15 comprises a dielectric connector 20. The connector 20 is securely fastened to the enclosure wall 30 via one or more fasteners 33, and surrounds inserted member 50 (e.g., with a clearance gap 44 or with a press-fit between the member 50 and connector 20). The connector 20 extends into recess 40, and may have a protrusion 51 that has a shape and size such that recess 40 can receive the protrusion with a clearance gap 52 between sides of the protrusion and one or more walls 53 of the recess 40.

The connector 20 may be composed of a plastic, a polymer, a dielectric filler in a polymer matrix, a dielectric filler in a plastic matrix, a glass, a ceramic, or similar material.

The connector 20 is securely fastened to the enclosure 5 via one or more fasteners 33, via another mechanical fastening mechanism, or via an adhesive. For example, the connector 20 may comprise holes through which screws, bolts, rivets, or other fasteners can pass to securely fasten connector 20 to enclosure wall 30. Alternatively, the connector 20 may be securely fastened to enclosure wall 30 by a clamp, clasp, or other means capable of securely fastening connector 20 to enclosure wall 30.

The connector 20, or its protrusion 51, functions to compress the seal 10 to form a moisture-resistant and debris-resistant barrier in the area defined by the recess 40, connector 20, and inserted member 50 when the connector 20 is securely fastened to the enclosure wall 30. When the dielectric connector 20 is securely fastened to enclosure wall 30, the portion of the connector 20 that extends into recess 40 engages the seal 10. The seal 10 is compressed to fill the area defined by or bounded by the recess 40, the connector 20, and the inserted member 50. Thus, a moisture-resistant and debris-resistant barrier is formed at the entry point of inserted member 50 into enclosure 5.

Inserted Member

As shown in FIGS. 1 and 2, interface 15 further comprises an inserted member 50. Inserted member 50 is inserted through opening 60, is electrically connected or coupled to one or more electrical or electronic components housed inside enclosure 5, and is surrounded by the seal 10 and the connector 20. The seal 10 engages inserted the member 50 to form a moisture-resistant and debris-resistant barrier when the connector 20 is securely fastened to enclosure wall 30. The inserted member 50 may comprise a member composed of metal or an alloy, or another electrically conductive metallic material.

In one embodiment, inserted member 50 comprises an electrical conductor. In this embodiment, inserted member connects to and conducts direct current or other electrical energy to the electronic or electrical device housed inside enclosure 5. For example, inserted member 50 may carry current from a capacitor, a battery or other energy source to power electronics, such as an inverter or motor controller, housed in enclosure 5. If the electrical or electronic device housed within enclosure 5 is an inverter, inserted member 50 serves as the direct current (DC) input to the inverter. The output of the inverter is generally one to three phase alternating current (AC) or pulse-width modulated signals, for example.

In another embodiment, inserted member 50 comprises a bus bar carrying direct current (DC) of high amperage from a capacitor bank or other energy source to power electronics, such as an inverter or motor controller, housed in enclosure 5. In this embodiment, inserted member 50 may comprise a generally rectangular cross section that terminates in a bus plate for an electrical connection to an electrical or electronic device within the enclosure interior. When the electrical or electronic device housed within enclosure 5 is an inverter, inserted member 50 serves as the direct current (DC) input to the inverter. The output of the inverter is one to three phase alternating current (AC) or pulse width modulated signals, for example.

Method of Use of Interface

To form a moisture-resistant and debris-resistant barrier about inserted member 50, inserted member 50 is inserted into opening 60 in enclosure wall 30. Inserted member 50 is connected to an electrical or electronic device housed in enclosure 5. For example, inserted member may carry direct current from a capacitor bank or other source to the input terminal (e.g., direct current input terminal) of an inverter housed within enclosure 5.

The seal 10 is situated in recess 40, and surrounds inserted member 50. Dielectric connector 20 extends into recess 40 and surrounding inserted member 50. When connector 20 is securely fastened to enclosure wall 30, the portion of connector 20 that extends into recess 40 engages seal 10. The seal 10 is compressed by connector 20, and deforms to fill the area defined by recess 40, connector 20, and inserted member 50. Thus, a moisture-resistant and debris-resistant barrier is formed at the entry point of inserted member 50 into enclosure 5.

Having described the preferred embodiment, it will become apparent that various modifications can be made without departing from the scope of the invention as defined in the accompanying claims.

The following is claimed:

1. An interface for an enclosure for housing an electrical or electronic device, the interface comprising:
    an enclosure comprising at least one enclosure wall that separates an enclosure interior from an enclosure exterior, an opening in the enclosure wall, and a recess in the enclosure wall, the recess adjoining the opening;
    a dielectric connector configured to securely fasten to the enclosure wall, the connector having a protrusion extending into the recess;
    a seal in the recess between the enclosure wall and the protrusion of the connector; and
    an inserted member inserted through the opening and surrounded by the seal and the connector, wherein securely fastening the connector to the enclosure wall compresses the seal to form a moisture-resistant barrier between the enclosure interior and the enclosure exterior and wherein the seal is compressed to fill an area defined by or bounded by the recess, the connector, and the inserted member.

2. The interface according to claim 1 wherein the inserted member comprises an electrical conductor.

3. The interface according to claim 1 wherein the inserted member comprises a member composed of metal or an alloy.

4. The interface according to claim 1 wherein the inserted member comprises a bus bar with a generally rectangular cross section that terminates in a bus plate for an electrical connection to an electrical or electronic device within the enclosure interior.

5. The interface according to claim 1 wherein the seal comprises a gasket.

6. The interface according to claim 1 wherein the recess comprises an enclosure pocket that is generally cylindrical and wherein the seal is generally annular.

7. The interface according to claim 1 wherein the recess comprises an enclosure pocket that is generally rectangular or polyhedral and wherein the seal conforms in shape to a perimeter of the enclosure pocket.

8. The interface according to claim 1 wherein the dielectric connector is composed of a material selected from the group consisting of a plastic, a polymer, a dielectric filler in a polymer matrix, a dielectric filler in a plastic matrix, a glass or a ceramic.

9. The interface according to claim 1 wherein the protrusion has a shape and size such that the recess can receive the protrusion with a clearance gap between sides of the protrusion and one or more walls of the recess.

10. The interface according to claim 1 wherein the dielectric connector is secured to the enclosure via one or more fasteners.

* * * * *